United States Patent
Chen et al.

(10) Patent No.: US 12,158,668 B2
(45) Date of Patent: *Dec. 3, 2024

(54) LIQUID CRYSTAL DISPLAY PANEL

(71) Applicant: TCL China Star Optoelectronics Technology Co., Ltd., Guangdong (CN)

(72) Inventors: Xingwu Chen, Guangdong (CN); Yoonsung Um, Guangdong (CN); Yinfeng Zhang, Guangdong (CN); Xin Zhang, Guangdong (CN); Lixuan Chen, Guangdong (CN); Dongze Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,582

(22) Filed: Dec. 24, 2023

(65) Prior Publication Data

US 2024/0126124 A1    Apr. 18, 2024

Related U.S. Application Data

(63) Continuation of application No. 16/765,900, filed as application No. PCT/CN2020/084835 on Apr. 15, 2020, now Pat. No. 11,868,011.

(30) Foreign Application Priority Data

Apr. 1, 2020 (CN) .......................... 202010250080.1

(51) Int. Cl.
*G02F 1/1343* (2006.01)
*G02F 1/1335* (2006.01)

(52) U.S. Cl.
CPC .. *G02F 1/134309* (2013.01); *G02F 1/133531* (2021.01); *G02F 1/133514* (2013.01); *G02F 2201/123* (2013.01)

(58) Field of Classification Search
CPC ............. G02F 1/1335; G02F 1/133514; G02F 1/133528; G02F 1/133531; G02F 1/1343;
(Continued)

(56) References Cited

U.S. PATENT DOCUMENTS

| 11,868,011 B2 * | 1/2024 | Chen ................. G02F 1/134309 |
| 2016/0011469 A1 | 1/2016 | Jung et al. |
| 2016/0377929 A1 | 12/2016 | Lim |

FOREIGN PATENT DOCUMENTS

| CN | 104280944 A | 1/2015 |
| CN | 106873257 A | 6/2017 |

(Continued)

OTHER PUBLICATIONS

Chinese Office Action issued in corresponding Chinese Patent Application No. 202010250080.1 dated Nov. 4, 2020, pp. 1-9.
Chinese Office Action issued in corresponding Chinese Patent Application No. 202010250080.1 dated Jun. 16, 2021, pp. 1-3.
International Search Report in International application No. PCT/CN2020/084835, mailed on Jan. 20, 2021.
(Continued)

*Primary Examiner* — Thoi V Duong
(74) *Attorney, Agent, or Firm* — Nathan & Associates; Menachem Nathan

(57) ABSTRACT

Liquid crystal display panels are provided. In the display panel, a first polarization direction of a first polarizer is perpendicular to a second polarization direction of a second polarizer; each pixel unit includes a pixel electrode including a trunk electrode, the trunk electrode includes a first and a second trunk electrodes disposed along a first direction and a second direction, respectively; an angle between the first direction and the first polarization direction is different from a right angle; the trunk electrode defines an area where the pixel unit is located as four domains, each domain is
(Continued)

provided with branch electrodes; the branch electrodes in adjacent domains arranged in a row direction form a first angle and a second angle with the first polarization direction respectively, the first angle ranges from 0 to 30 degrees, and the second angle ranges from 60 degrees to 90 degrees.

20 Claims, 11 Drawing Sheets

(58) Field of Classification Search
CPC ........... G02F 1/134309; G02F 1/13439; G02F 1/1362; G02F 1/133707; G02F 1/137; G02F 2201/122; G02F 2201/123
See application file for complete search history.

(56) References Cited

FOREIGN PATENT DOCUMENTS

| | | |
|---|---|---|
| CN | 109683406 A | 4/2019 |
| CN | 209103061 U | 7/2019 |
| CN | 110794625 A | 2/2020 |
| CN | 110824789 A | 2/2020 |
| CN | 110928067 A | 3/2020 |
| CN | 110941121 A | 3/2020 |
| TW | 201120543 A | 6/2011 |

OTHER PUBLICATIONS

Written Opinion of the International Search Authority in International application No. PCT/CN2020/084835, mailed on Jan. 20, 2021.

* cited by examiner

| P/microns | left-handed liquid crystal | | right-handed liquid crystal | |
|---|---|---|---|---|
| | first angle /degrees | second angle /degrees | first angle /degrees | second angle /degrees |
| 11≤P | 75≤a≤90 | 0≤b≤15 | 0≤a≤15 | 75≤b≤90 |
| 11≤P≤13.5 | 75≤a≤90 | 0≤b≤15 | 0≤a≤15 | 75≤b≤90 |
| 13.5≤P≤16 | 70≤a≤90 | 0≤b≤20 | 0≤a≤20 | 70≤b≤90 |
| 16≤P≤18.5 | 65≤a≤90 | 5≤b≤25 | 5≤a≤25 | 65≤b≤90 |
| 18.5≤P | 60≤a≤90 | 10≤b≤30 | 10≤a≤30 | 60≤b≤90 |

LIQUID CRYSTAL DISPLAY PANEL

CROSS-REFERENCE TO RELATED APPLICATIONS

This application is a continuation application of U.S. patent application Ser. No. 16/765,900, filed on May 21, 2020, which is a US national phase application based upon an International Application No. PCT/CN2020/084835, filed on Apr. 15, 2020, which claims priority to Chinese Patent Application No. 202010250080.1, filed on Apr. 1, 2020. The disclosures of the aforementioned applications are incorporated herein by reference in their entireties.

FIELD OF INVENTION

The present disclosure relates to a field of display technology, in particular to a liquid crystal display panel.

BACKGROUND OF INVENTION

A liquid crystal display panel generally includes an array substrate and a color filter substrate that are oppositely arranged, a liquid crystal layer is filled between the array substrate and the color filter substrate, and pixel electrodes for driving liquid crystal to rotate is arranged on the array substrate. As shown in FIG. 1, in a multi-domain liquid crystal display panel, the pixel electrodes are patterned, and the pixel electrodes generally include a main electrode 11 and a branch electrode 12 connected to the main electrode 11.

However, in a small-angle area 13 where an angle formed between the branch electrode 12 and the main electrode 11 is relatively small, the pixel electrodes at the small-angle area 13 are difficult to etch due to machine limitations during the patterning of the pixel electrodes, such that the pixel electrodes preset to be etched at the small-angle area 13 may be not etched or incompletely etched, thereby causing dark lines at the small-angle area when performing liquid crystal alignment.

In the existing liquid crystal display panel, in the process of patterning the pixel electrode, the pixel electrode preset to be etched at a small-angle area is not etched or incompletely etched, resulting in dark lines at the small-angle area when performing liquid crystal alignment.

SUMMARY

The present disclosure provides a liquid crystal display panel. The liquid crystal display panel includes an array substrate including a plurality of pixel units arranged in an array, a color filter substrate disposed opposite to the array substrate, a liquid crystal layer disposed between the array substrate and the color filter substrate, a first polarizer disposed on a side of the array substrate facing away from the liquid crystal layer and having a first polarization direction, and a second polarizer disposed on a side of the color filter substrate facing away from the liquid crystal layer and having a second polarization direction perpendicular to the first polarization direction. Each pixel unit includes a pixel electrode, and the pixel electrode includes a trunk electrode including a first trunk electrode disposed along a first direction and a second trunk electrode disposed along a second direction, and an angle between the first direction and the first polarization direction is different from a right angle. The trunk electrode defines an area where the pixel unit is located as four domains, each domain is provided with branch electrodes connected to the trunk electrode, the branch electrodes in adjacent ones of the domains arranged in a row direction of the pixel units form a first angle and a second angle with the first polarization direction respectively, the first angle ranges from 0 to 30 degrees, and the second angle ranges from 60 degrees to 90 degrees.

DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

Figure 1:
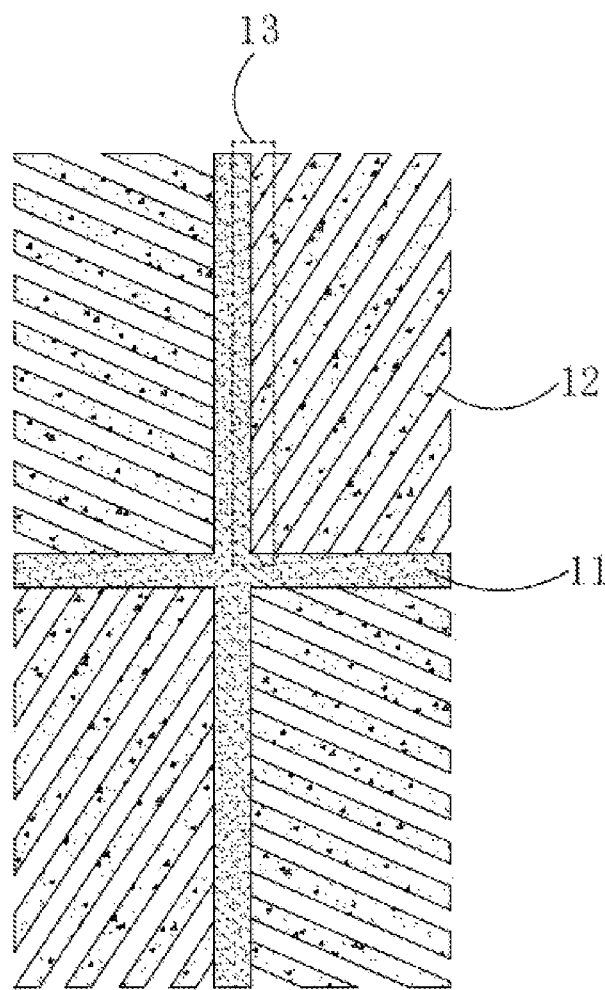
FIG. 1 is a schematic structural diagram of a liquid crystal display panel in the Description of Prior Art of the present disclosure.

Elements in the drawings are designated by reference numerals listed below.

11, main electrode; 12, branch electrode; 13, small-angle area; 20, array substrate; 21, first substrate; 22, thin film transistor layer; 221, scan line; 222, data line; 23, pixel unit; 231, first pixel area; 232, second pixel area; 24, pixel electrode 241, first trunk electrode; 241a, first split; 241b, second split; 242, second trunk electrode; 242a, first part; 242b, second part; 242c, third part; 242d, fourth part; 243, branch electrode; 243a, middle branch portion; 243b, side branch portion; 244, first pixel electrode; 245, second pixel electrode; 246a, first edge electrode; 246b, second edge electrode 246c, third edge electrode; 247, connecting portion; 248a, middle trunk portion; 248b, lateral trunk portion;

30, color filter substrate; 31, second substrate; 32, color resist block; 33, light-shading block; 34, common electrode; 35, support post; 40, liquid crystal layer; 50, sealant; 71, first polarizer; 72, second polarizer; 81, first direction; 82, second direction; 83, first polarization direction; 84, second polarization direction; 91, first domain; 92, second domain; 93, third domain; 94, fourth domain; 95, first partition; 96, second partition; 97, central area.

DETAILED DESCRIPTION OF PREFERRED EMBODIMENTS

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the figures, structurally similar elements are denoted by the same reference numerals.

The present disclosure is directed to solve the technical problem of the existing liquid crystal display panel that in the process of patterning the pixel electrode, the pixel electrode preset to be etched at a small-angle area is not etched or incompletely etched, resulting in dark lines at the small-angle area when performing liquid crystal alignment.

Figure 2:
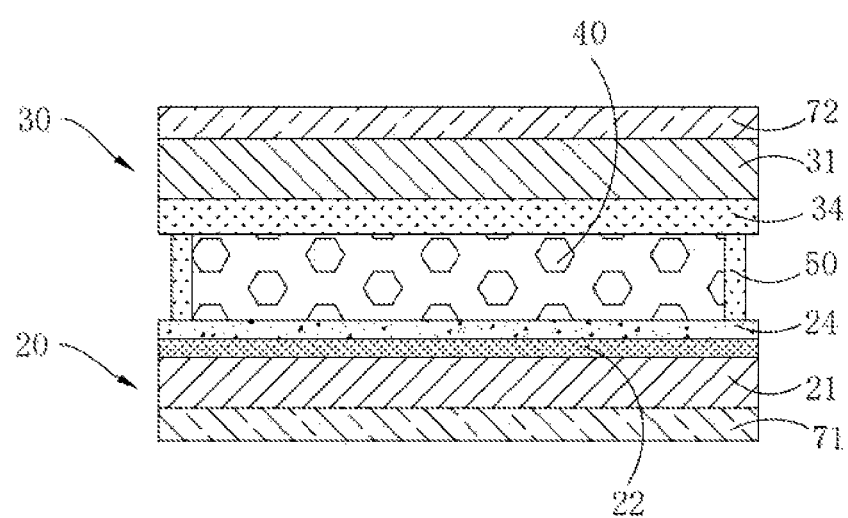
FIG. 2 is a first schematic structural diagram of a liquid crystal display panel according to a specific embodiment of the application.
Figure 3:
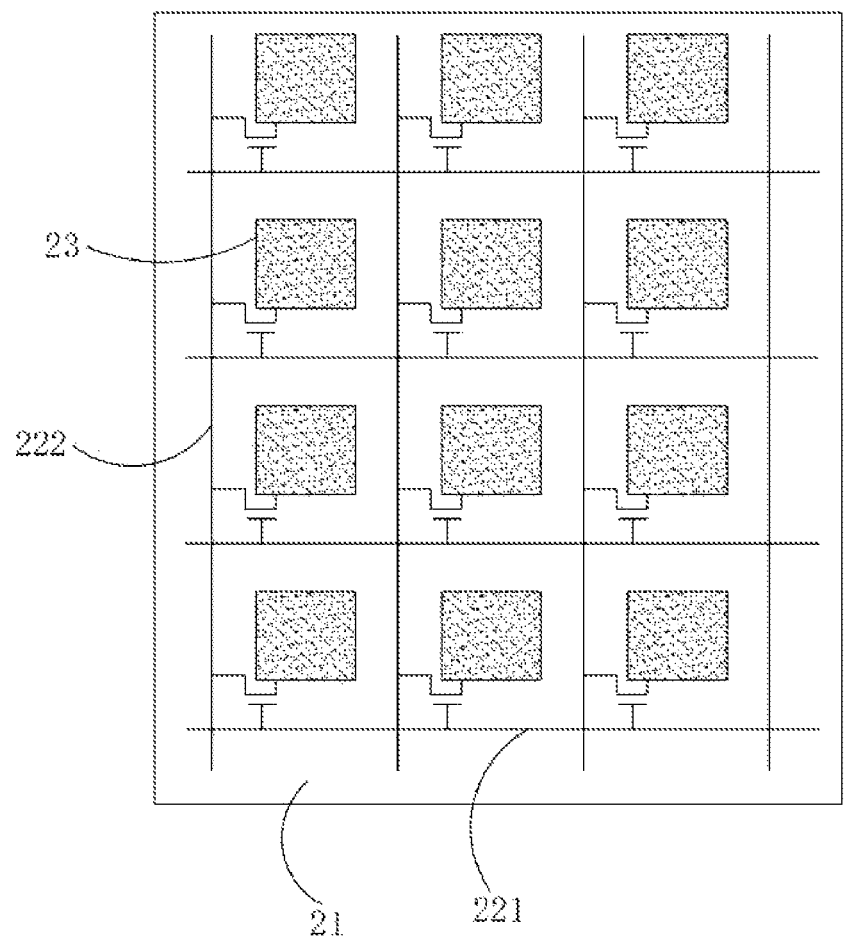
FIG. 3 is a schematic diagram of arrangement of pixel units according to an embodiment of the present disclosure.

As shown in FIGS. 2 and 3, the liquid crystal display panel includes an array substrate 20, a color filter substrate 30, and a liquid crystal layer 40. The color filter substrate 30 is disposed opposite to the array substrate 20. The liquid crystal layer 40 is disposed between the array substrate 20 and the color filter substrate 30, a sealant 50 is disposed between the array substrate 20 and the color filter substrate 30, a receiving cavity for receiving the liquid crystal layer 40 is formed between the array substrate 20, the color filter substrate 30 and the sealant 50.

Specifically, the array substrate 20 includes a first substrate 21 and a plurality of pixel units 23 arrayed on the first substrate 21, and each of the pixel units 23 includes a thin film transistor layer 22 and a pixel electrode 24 disposed on the thin film transistor 22; and a color filter substrate 30 includes a second substrate 31 and a common electrode 34 disposed on the second substrate 31 and opposite to the pixel unit 23. An electric field formed by a pressure difference between the pixel electrode 24 and the common electrodes 34 drives the liquid crystal in the liquid crystal layer 40 to rotate.

Each of the first substrate 21 and the second substrate 31 may be a flexible substrate or a hard substrate, and each of the first substrate 21 and the second substrate 31 may be a glass substrate or a plastic substrate.

In one embodiment, the thin film transistor layer 22 includes a first metal layer disposed on the first substrate 21 and a second metal layer disposed above the first metal layer.

Wherein, the first metal layer includes a plurality of scan lines 221, the scan lines 221 are arranged along a row direction of the pixel units 23, and the plurality of scan lines 221 are arranged at intervals along a column direction of the pixel units 23. The second metal layer includes a plurality of data lines 222, the data lines 222 are arranged along the column direction of the pixel units 23, and the plurality of data lines 222 are arranged at intervals along the row direction of the pixel units 23, An area defined by intersections between adjacent ones of the data lines 222 and adjacent ones of the scan lines 221 is an area where each of the pixel units 23 is provided.

In one embodiment, each of the scan lines 221 correspondingly electrically connected to one row of the pixel units 23 to provide scan signals for the pixel units 23; each of the data lines 222 correspondingly electrically connected to one column of the pixel units 23 to provide data signals for the pixel units 23.

Specifically, the liquid crystal display panel further includes a first polarizer 71 and a second polarizer 72, wherein the first polarizer 71 is disposed on a side of the first substrate 21 away from the pixel unit 23, and the second polarizer 72 is disposed on a side of the color filter substrate 30 away from the array substrate 20.

Figure 4:
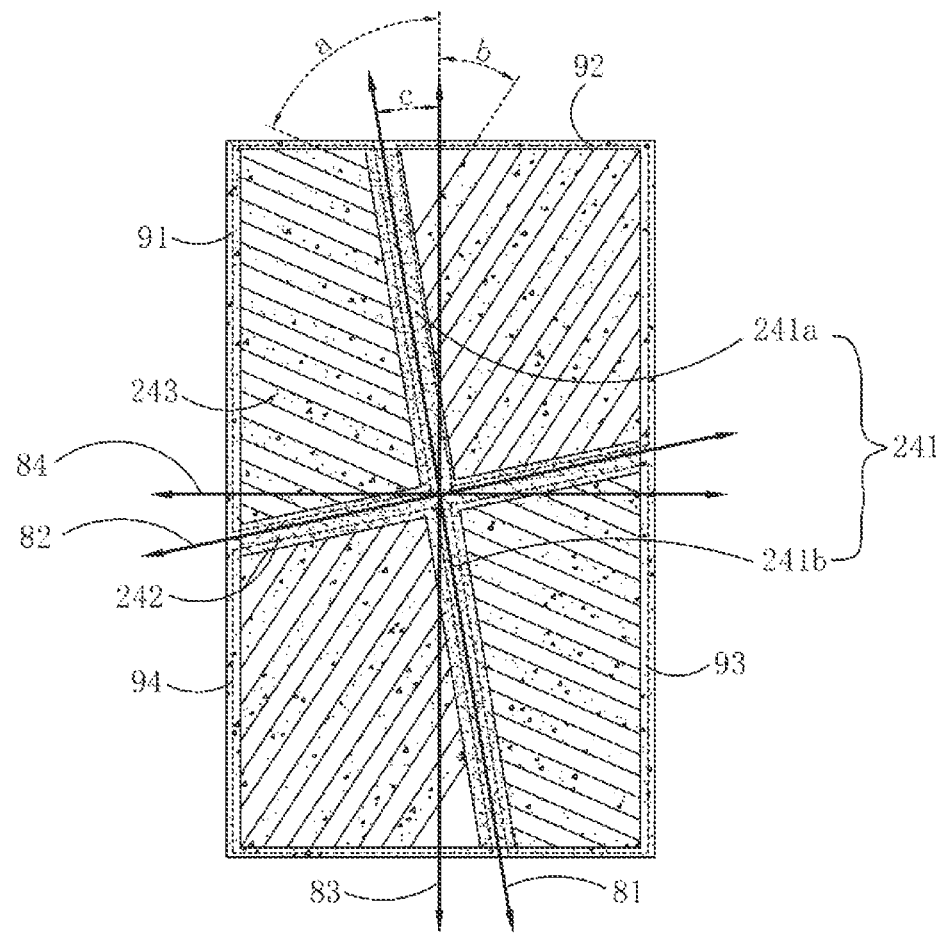
FIG. 4 is a schematic diagram of a first structure of a pixel electrode according to a specific embodiment of the present disclosure.

Specifically, as shown in FIG. 4, the first polarizer 71 has a first polarization direction 83, the second polarizer 72 has a second polarization direction 84, and the first polarization direction 83 of the first polarizer 71 and the second polarization direction 84 of the second polarizer 72 is perpendicular to each other.

Specifically, the pixel electrode 24 includes a trunk electrode. The trunk electrode includes a first trunk electrode 241 disposed along a first direction 81 and a second trunk electrode 242 disposed along a second direction 82. The trunk electrode defines an area where the pixel unit 23 is located as 4 domains, any one of the domains is provided with a branch electrode 243 connected to the trunk electrode, and a plurality of the branch electrodes 243 in any one of the domains may be arranged at intervals to increase the transmittance of the pixel electrode 24.

An angle between the first direction 81 and the first polarization direction 83 is different from a right angle, that is, neither the first direction 81 nor the first polarization direction 83 are not parallel to the second polarization direction 84.

It should be noted that, by arranging the first trunk electrode 241 obliquely with respect to the first polarization direction 83 and the second polarization direction 84, an angle formed between the branch electrode 243 and the first trunk electrode 241 at a small-angle area can be increased, while the angle formed between the branch electrodes 243 in adjacent ones of the domains is ensured to remain unchanged, such that phenomenon of unetched or incomplete etched small-angle area can be prevented when the pixel electrode 24 is patterned, thereby preventing dark lines from appearing in the small-angle area during liquid crystal alignment.

The first direction 81 may be perpendicular to the second direction 82, and the trunk electrode may be integrally formed with the branch electrode 243.

In one embodiment, the first trunk electrode 241 is located between adjacent ones of the domains arranged along the row direction of the pixel units 23, and the second trunk electrode 242 is located between adjacent ones of the domains along the column direction of the pixel units 23.

It should be noted that the first trunk electrode 241 may be located between adjacent ones of the domains arranged along the column direction of the pixel units 23, and the second trunk electrode 242 may be located between the adjacent ones of the domains along the row direction of the pixel units 23.

Specifically, the first trunk electrode 241 includes a first split 241a and a second split 241b located on opposite sides of the second trunk electrode 242, and the first split 241a and the second split 241b are both connected to the second trunk electrode 242.

Specifically, each of the pixel units 23 includes a first domain 91, a second domain 92 adjacent to the first domain 91 along the row direction of the pixel units 23, a third domain 93 adjacent to the second domain 92 along a column direction of the pixel units 23, and a fourth domain 94 adjacent to the third domain 93 along the row direction of the pixel units 23.

In one embodiment, in each of the domains, all the branch electrodes 243 are parallel to each other; an angle formed between the branch electrode 243 in the first domain 91 and the first polarization direction 83 is different from an angle formed between the branch electrode 243 in the second domain 92 and the first polarization direction 83, the branch electrode 243 in the first domain 91 and the branch electrode 243 in the third domain are parallel to each other, and the branch electrode 243 in the second domain 92 and the branch electrode 243 in the fourth domain 94 are parallel to each other.

The branch electrodes 243 in the adjacent ones of the domains arranged along the row direction of the pixel units 23 respectively form a first angle a and a second angle b with the first polarization direction 83, and a third angle c is formed between the first direction 81 and the first polarization direction 83.

Referring to FIG. 4, take the case for example that the first trunk electrode 241 is located between adjacent ones of the domains arranged along the row direction of the pixel units 23, and the second trunk electrode 242 is located between adjacent ones of the domains along the column direction of the pixel units 23, and the first polarization direction 83 is parallel to the column direction of the pixel units 23, and the second polarization direction 84 is parallel to the row direction of the pixel units 23.

The branch electrode 243 in the first domain 91 and the first polarization direction 83 form the first angle a, and the branch electrode 243 in the second domain 92 and the first polarization direction 83 form the second angle a. When the first angle is greater than the second angle b, the first split 241a is inclined toward the first domain 91, that is, the first split 241a is located between the first domain 91 and the first polarization direction 83, and at this time, the angle formed between the branch electrode 243 and the first trunk electrode 241 in the second domain 92 is equal to a sum of the second angle b and the third angle c. In the case where the direction of the branch electrode 243 in the first domain 91 and the direction of the branch electrode 243 in the second domain 92 both remain unchanged, The angle formed between the trunk electrode 243 in the second domain and the first trunk electrode 241 is increased by tilting the first trunk electrode 241, such the problem of uneven etching in the small-angle area can be improved, thereby preventing dark lines from being generated in the small-angle area when performing liquid crystal alignment.

It should be noted that, when the second included angle b is greater than the first included angle a, the first split 241a may be inclined toward the second domain 92, that is, the first split 241a is located in between the second domain 92 and the first polarization direction 83.

It should be noted that in actual implementation, the first polarization direction 83 may be parallel to the row direction of the pixel units 23, and the second polarization direction 84 may be parallel to the column direction of the pixel units 23. Also, the first polarization direction 83 may be set to be not parallel to both of the row direction and column direction of the pixel units 23.

Specifically, the first included angle a is 0-30 degrees, the second included angle b is 60-90 degrees, and the third included angle c is 5-25 degrees. By designing the angle formed between the branch electrode 243 and the first polarization direction 83 and the angle formed between the first trunk electrode 241 and the first polarization direction 83 in different domains, the problem of uneven etching in the small-angle area is improved, and meanwhile the transmittance of the pixel electrode 24 can be increased.

As shown in FIG. 4, the first split 241a and the second split 241b may be located on the same straight line.

Figure 5:
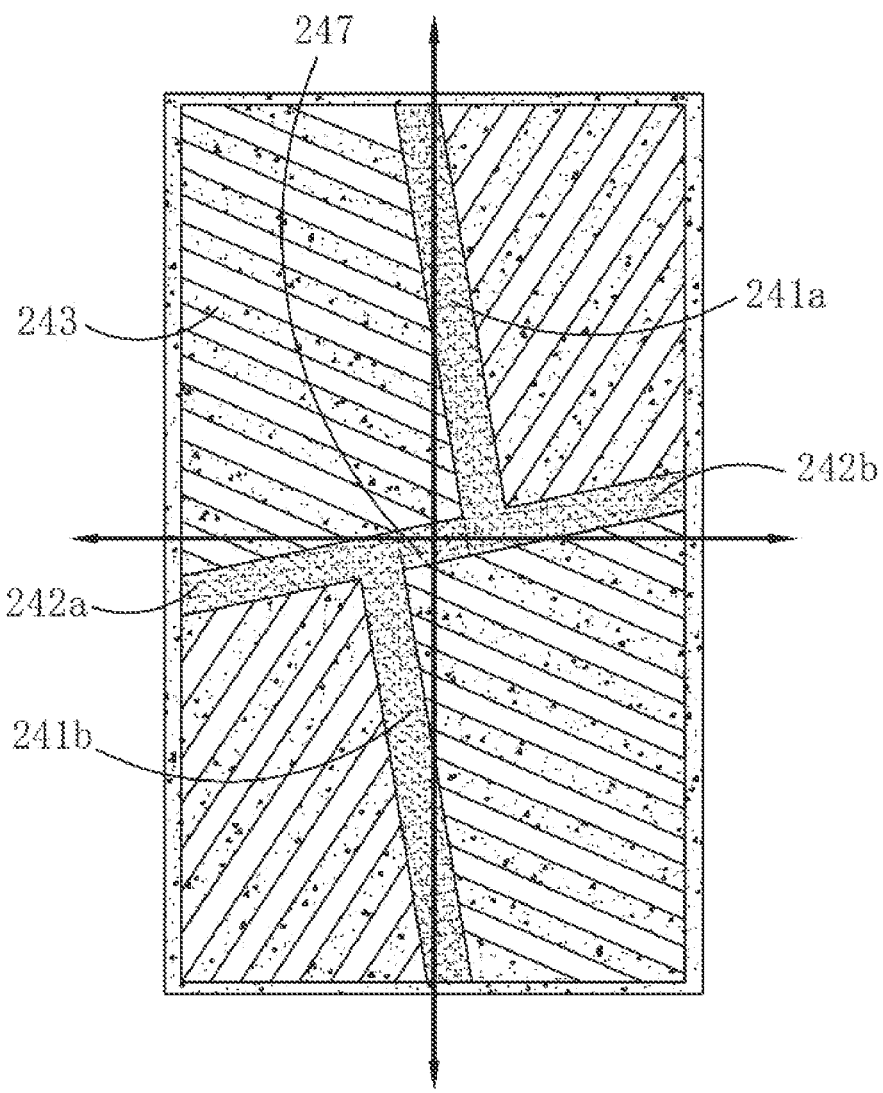
FIG. 5 is a schematic diagram of a second structure of a pixel electrode according to a specific embodiment of the present disclosure.
Figure 6:
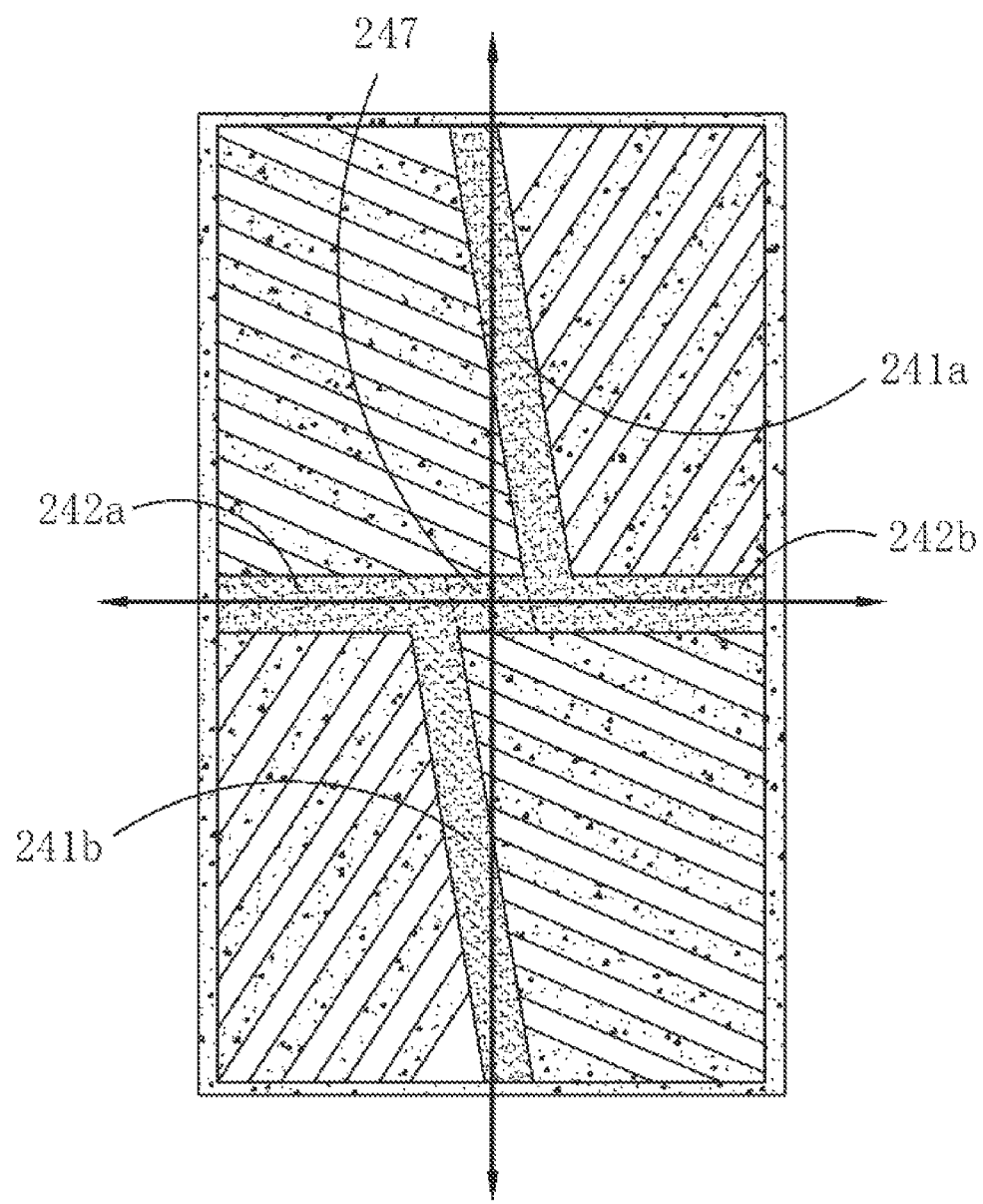
FIG. 6 is a schematic diagram of a third structure of a pixel electrode according to a specific embodiment of the present disclosure.
Figure 7:
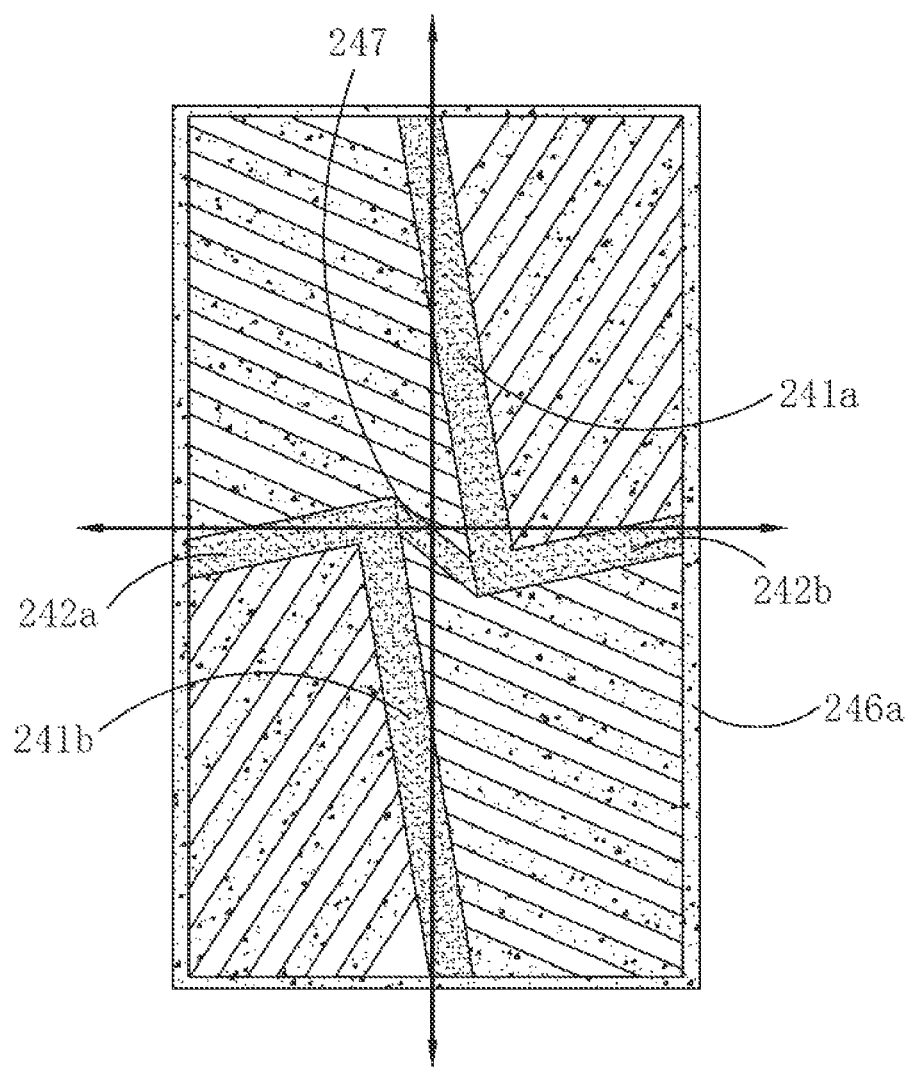
FIG. 7 is a schematic diagram of a fourth structure of a pixel electrode according to a specific embodiment of the present disclosure.

As shown in FIG. 5 to FIG. 7, the first split 241a may also be staggered with the second split 241b.

It should be noted that, when the first split 241a and the second split 241b are staggered with each other, along the second direction 82, a distance between the first split 241a and the second split 241b can be 3-25 um.

Specifically, as shown in FIGS. 5 to 7, the second trunk electrode 242 includes a first part 242a and a second part 242b respectively located on opposite sides of the first trunk electrode 241, the first part 242a and the second part 242b both are connected to the first trunk electrode 241, the first part 242a and the second part 242b are electrically connected by a connecting portion 247, and the connecting portion 247 can be integrally formed with the first part 242a and the second part 242b.

As shown in FIG. 5, an angle formed between the second direction 82 and the second polarization direction 84 may be different from a right angle, that is, neither the first polarization direction 83 nor the second polarization directions 84 are not parallel to the second direction 82.

As shown in FIG. 6, the second direction 82 may be parallel to the second polarization direction 84.

Specifically, as shown in FIG. 5 and FIG. 6, the first part 242a and the second part 242b may be located on the same straight line. At this time, an extending direction of the connecting portion 247 may be parallel to the second direction 82.

As shown in FIG. 7, the first part 242a may also be staggered with the second part 242b. At this time, an extending direction of the connecting portion 247 may be different from the second direction 82, that is, the extending direction of may not be parallel to the second direction 82.

When the first part 242a and the second part 242b are staggered with each other, along the first direction 81, a distance between the first part 242a and the second part 242b may be 3-25 um.

Referring to FIGS. 4-7, in one embodiment, the pixel electrode 24 further includes a first edge electrode 246a, the first edge electrode 246a is disposed around an outer boundary of the trunk electrode to form a closed first Accommodation area, the trunk electrode and the branch electrode 243 are both located in the first accommodation area, the trunk electrode and the branch electrode 243 are both connected to the first edge electrode 246a, the trunk The electrode and the branch electrode 243 may be integrally formed with the first edge electrode 246a.

Figure 8:
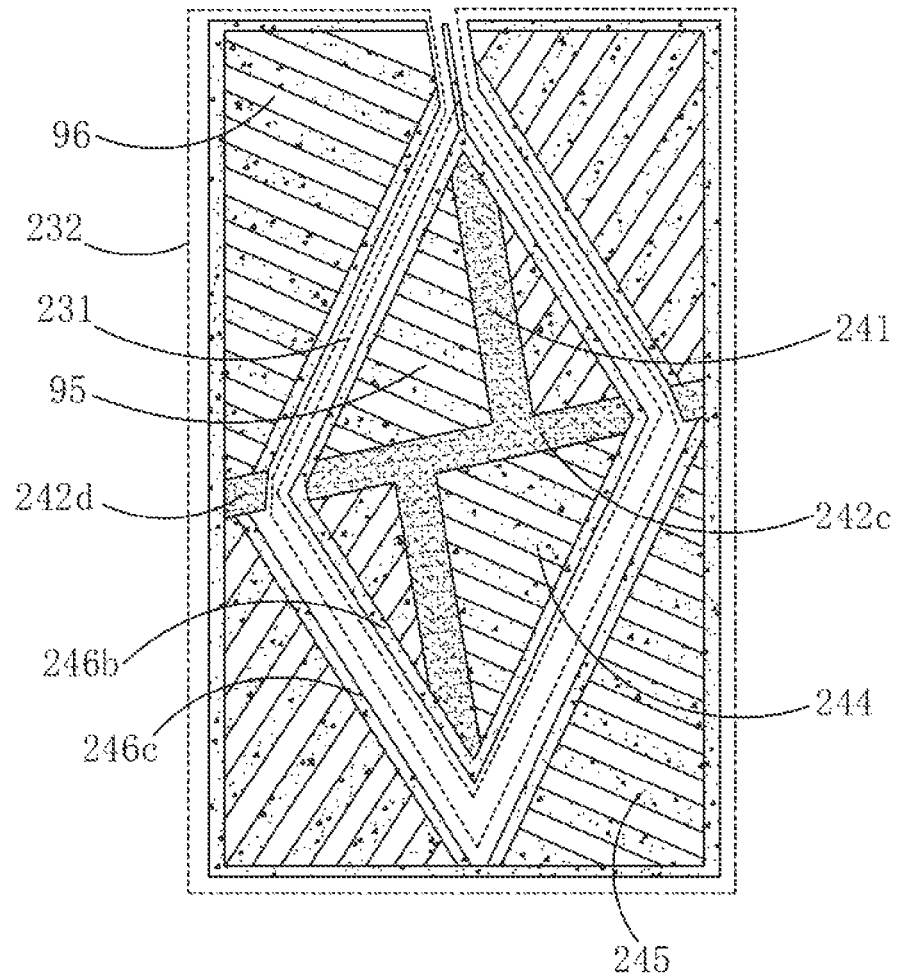
FIG. 8 is a schematic diagram of a fifth structure of a pixel electrode according to a specific embodiment of the present disclosure.
Figure 9:
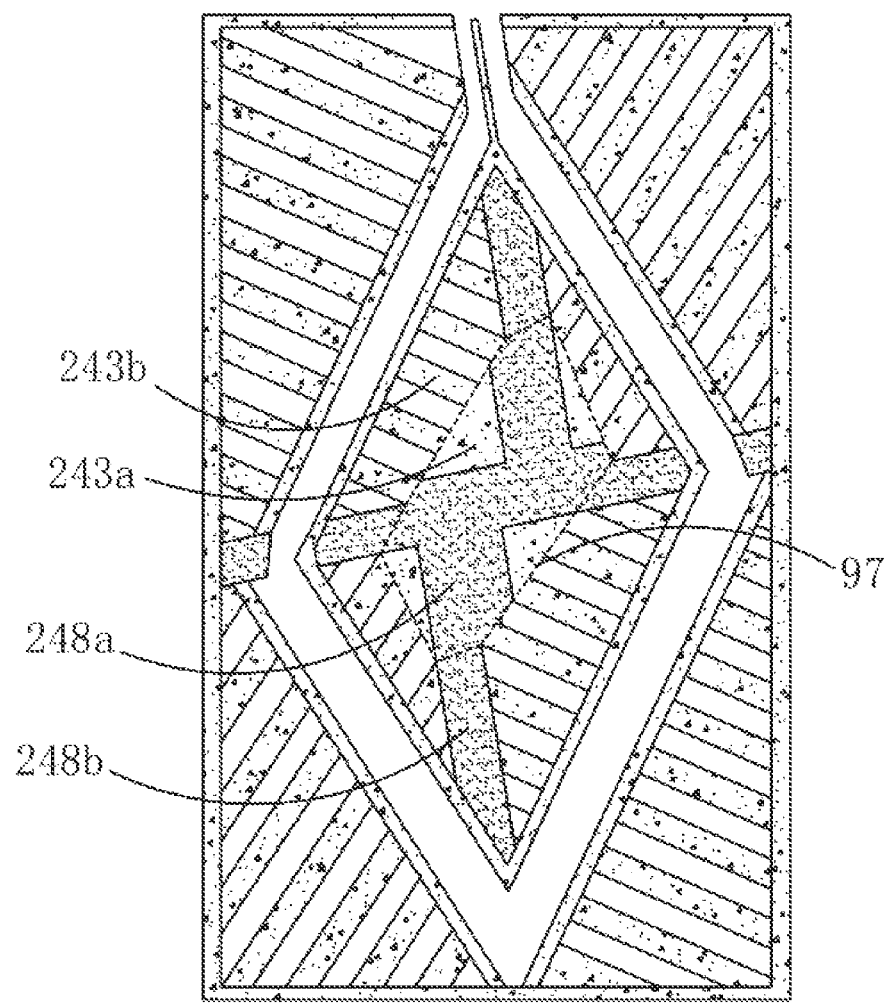
FIG. 9 is a schematic diagram of a sixth structure of a pixel electrode according to a specific embodiment of the present disclosure.
Figure 10:
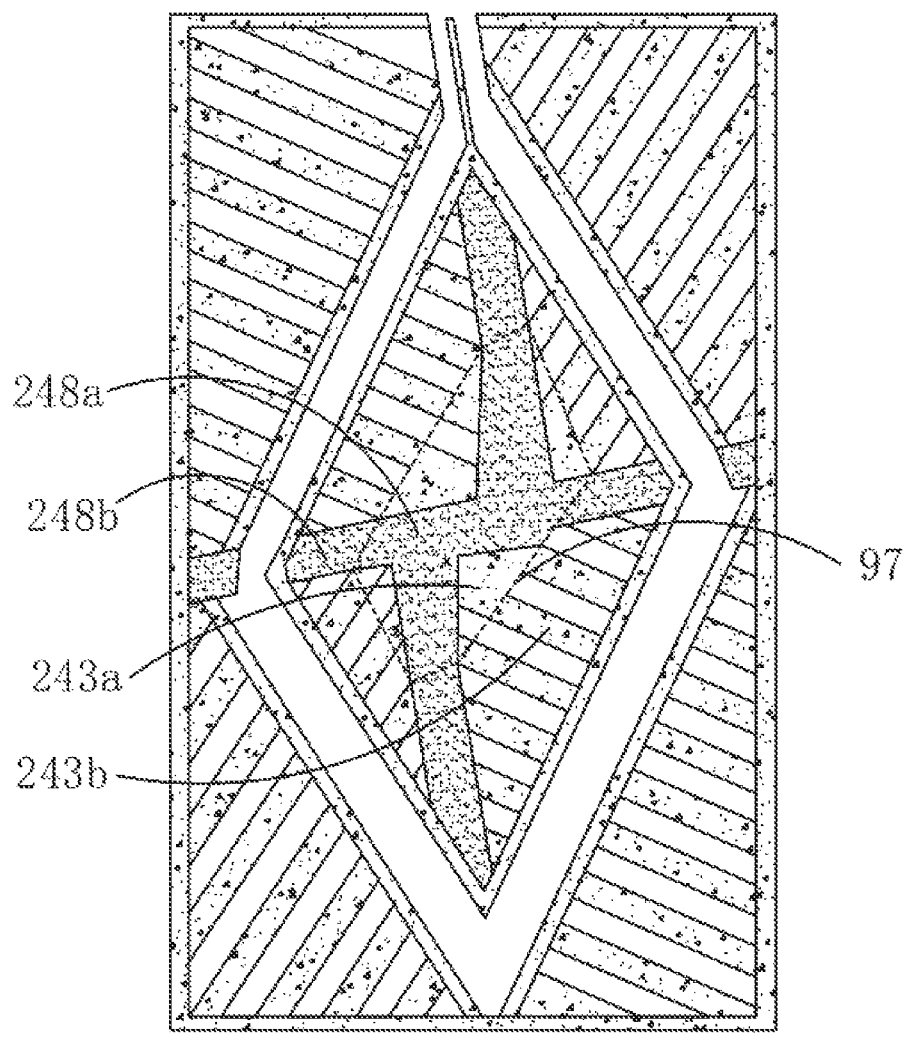
FIG. 10 is a schematic diagram of a seventh structure of a pixel electrode according to a specific embodiment of the present disclosure.

In one embodiment, as shown in FIGS. 8 to 10, each of the pixel units 23 includes a first pixel area 231 and a second pixel area 232 spaced apart from each other, the second pixel area 232 is disposed along an outer boundary of the first pixel area 231; the pixel electrode 24 includes a first pixel electrode 244 located in the first pixel area 231 and a second pixel electrode 245 located in the second pixel area 232, the first pixel electrode 244 and the second pixel electrode 245 are spaced apart from each other, and the second pixel electrode 245 is disposed along an outer boundary of the first pixel electrode 244.

It should be noted that after the pixel electrode 24 is formed, the pixel electrode 24 is etched to form the first pixel electrode 244 and the second pixel electrode 245 that are spaced apart from each other, and an voltage input to the first pixel electrode 244 is different from a voltage input to the second pixel electrode 245, so that a pre-tilt angle formed by the liquid crystal of the first pixel area 231 is different from a pre-tilt angle formed by the liquid crystal of the second pixel area 232 during the alignment process, thereby increasing various tilt directions of the liquid crystal, which is conducive to optimization of viewing angles.

The first pixel electrode 244 is a main pixel electrode, and the second pixel electrode 245 is a sub-pixel electrode.

Specifically, the first trunk electrode 241 is located in the first pixel area 231, and the second trunk electrode 242 includes a third part 242c located in the first pixel area 231 and a fourth part 242d located in the second pixel area 232.

On the premise of increasing various tilt directions of the liquid crystal, the first pixel electrode 244 and the second pixel electrode 245 share one trunk electrode, such that the pixel area occupied by the trunk electrode can be reduced, thereby reducing the generation of dark lines in the pixel units 23, and improving the transmittance and liquid crystal efficiency in the pixel units 23.

Specifically, each of the domains includes at least one first partition 95 located in the first pixel area 231 and a second partition 96 located in the second pixel area 232.

In each of the domains, the branch electrode 243 in the first partition 95 and the branch electrode 243 in the second partition 96 may be parallel or non-parallel to each other.

In one embodiment, the pixel electrode 24 further includes a second edge electrode 246b and a third edge electrode 246c. The second edge electrode 246b is disposed around an outer boundary of the first pixel electrode 244 to form a closed second accommodation area, the first pixel electrode 244 is located in the second accommodation area, the first pixel electrode 244 is connected to the second edge electrode 246b, and the first pixel electrode 244 may be integrally formed with the second edge electrode 246b. The third edge electrode 246c is disposed around an outer boundary of the second pixel electrode 245 to form a closed third accommodation area, the second pixel electrode 245 is located in the third accommodation area, the second pixel electrode 245 is connected to the third edge electrode 246c, and the second pixel electrode 245 may be integrally formed with the third edge electrode 246c.

As shown in FIGS. 9 and 10, the trunk electrode includes a middle trunk portion 248a and a lateral trunk portion 248b located on a side of the middle trunk portion 248a, and the branch electrode 243 includes a middle branch portion 243a and a side branch portion 243b located on a side of the middle branch portion 243a; the middle trunk portion 248a and the middle branch portion 243a are located in a central area 97 of the pixel electrode 24, a width of the middle trunk portion 248a is greater than a width of the side trunk portion 248b, and a width of the middle branch portion 243a is greater than a width of the side branch portion 243b.

It should be noted that, by increasing the width of the middle trunk portion 248a and the middle branch portion 243a at the central area 97 of the pixel electrode 24, the electric field at the central area 97 of the pixel electrode 24 is increased, thereby increasing the pixel electrode 24 during alignment The pretilt angle of the liquid crystal at the central area 97 of the LCD, and the greater the pretilt angle of the liquid crystal, the faster the response speed, thereby effectively improving the dark stripes at the central area 97 of the pixel electrode 24, and the electric field of The electric fields of the side areas of the pixel electrode 24 are different, thereby increasing the reverse direction of the liquid crystal in different directions, which is beneficial to the optimization of the viewing angle.

As shown in FIG. 9, the central area 97 of the pixel electrode 24 may be filled with a pixel electrode material to further increase the electric field at the central area 97 of the pixel electrode 24. As shown in FIG. 10, the central area 97 may also have a hollow structure to improve the transmittance of the central area 97 of the pixel electrode 24.

Specifically, the liquid crystal layer 40 includes a liquid crystal material and a chiral agent.

It should be noted that by adding a chiral agent to the liquid crystal material, the liquid crystal molecules can periodically rotate, and a helical twisting force generated by the chiral agent drives the liquid crystal molecules at the edge of the pixel electrode 24 to rotate, effectively reducing a width of the dark lines at an edge of the pixel electrode 24.

Wherein, the chiral agent may be a left-handed chiral agent or a right-handed chiral agent, and the liquid crystal material is a negative liquid crystal.

Figures 11, 12:
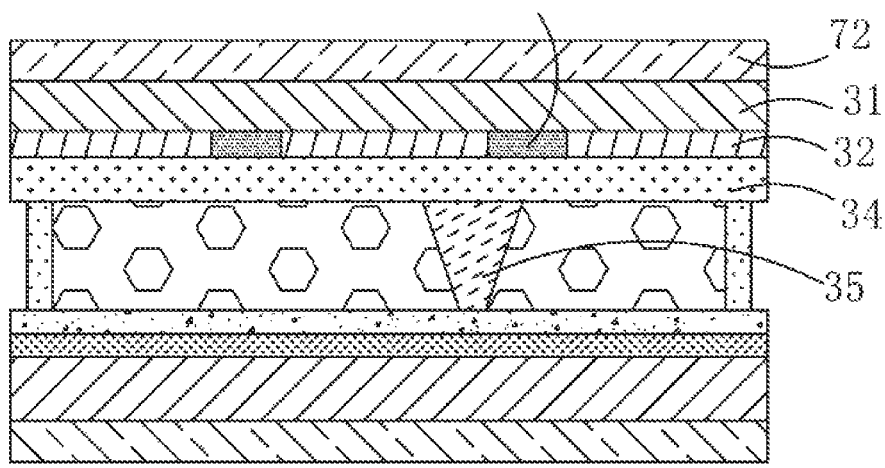
FIG. 11 is a schematic diagram of a relationship between a pitch of the liquid crystal material and the first included angle and the second included angle according to a specific embodiment of the present disclosure.
FIG. 12 is a second schematic structural diagram of a liquid crystal display panel according to a specific embodiment of the present disclosure.

As shown in FIG. 11, FIG. 11 is the relationship between the pitch P of the liquid crystal material and the first included angle a and the second included angle b.

It should be noted that the pitch P is a distance between adjacent levels at which the liquid crystal molecules respectively have an original orientation and an orientation the same as original orientation after the liquid crystal molecules rotate 360 degrees. By adjusting the relationship between the pitch P of the liquid crystal material and the first included angle a and the second included angle b, a width of the dark area between adjacent ones of the pixel electrodes 24 can be effectively reduced, thereby increasing the effective aperture ratio and enhancing the transmittance.

Specifically, the liquid crystal layer has an optical path difference of 300 to 550 nanometers and a thickness of 2.5 to 4 microns, and is made of a material having a pitch of 2 to 10 times the thickness of the liquid crystal layer, to increase the transmittance per unit area of the pixel unit 23.

In one embodiment, as shown in FIG. 12, the color filter substrate 30 further includes a color resist layer disposed on a side of the second substrate 31 away from the second polarizer 72, and the common electrode 34 is disposed on the color resist layer.

The color resist layer includes a plurality of color resist blocks 32 arranged at intervals. Each of the color resist blocks 32 may be any one of a red color resist block, a blue color resist block, and a green color resist block, so as to realize color display.

Light-shading blocks 33 are provided between adjacent ones of the color resist blocks 32 to avoid light leakage in the gap between adjacent ones of the color resist blocks 32.

Specifically, the common electrode 34 is provided with a support post 35 in contact with the common electrode 34 and the pixel electrode 24. The support post 35 is configured to maintain a spacing between the color filter substrate 30 and the array substrate 20.

Beneficial effects of the present invention are that by arranging the first trunk electrode 241 obliquely with respect to the first polarization direction 83 and the second polarization direction 84, an angle formed by the branch electrode 243 and the first main electrode 241 between adjacent ones of the domains, such that an angle formed between the branch electrode 243 and the first trunk electrode 241 at a small-angle area can be increased, and phenomenon of unetched or incomplete etched small-angle area can be prevented when the pixel electrode 24 is patterned, thereby preventing dark lines from appearing in the small-angle area during liquid crystal alignment.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A liquid crystal display panel, comprising:
an array substrate, comprising a plurality of pixel units arranged in an array;
a color filter substrate, disposed opposite to the array substrate;
a liquid crystal layer, disposed between the array substrate and the color filter substrate;
a first polarizer, disposed on a side of the array substrate facing away from the liquid crystal layer and having a first polarization direction; and
a second polarizer, disposed on a side of the color filter substrate facing away from the liquid crystal layer and having a second polarization direction perpendicular to the first polarization direction,
wherein each pixel unit of the pixel units comprises a pixel electrode, and the pixel electrode comprises a trunk electrode comprising a first trunk electrode disposed along a first direction and a second trunk electrode disposed along a second direction, and an angle between the first direction and the first polarization direction is different from a right angle;
the trunk electrode defines an area where the pixel unit is located as four domains, each of the domains is provided with branch electrodes connected to the trunk electrode, the branch electrodes in adjacent ones of the domains arranged in a row direction of the pixel units form a first angle and a second angle with the first polarization direction respectively, the first angle ranges from 0 to 30 degrees, and the second angle ranges from 60 degrees to 90 degrees.

2. The liquid crystal display panel according to claim 1, wherein the first direction and the first polarization direction form a third angle, and the third angle ranges from 5 degrees to 25 degrees.

3. The liquid crystal display panel according to claim 1, wherein the first trunk electrode is located between adjacent ones of the domains disposed along a row direction of the pixel units, and the second trunk electrode is located between adjacent ones of the domains disposed along a column direction of the pixel units.

4. The liquid crystal display panel according to claim 3, wherein the first trunk electrode comprises a first split body and a second split body located on opposite sides of the second trunk electrode respectively, the first split body and the second split body are both connected to the second trunk electrode.

5. The liquid crystal display panel according to claim 4, wherein the first split body and the second split body are located on a same straight line.

6. The liquid crystal display panel according to claim 4, wherein the first split body and the second split body are staggered with each other.

7. The liquid crystal display panel according to claim 3, wherein an angle formed between the second direction and the second polarization direction is different from the right angle.

8. The liquid crystal display panel according to claim 3, wherein the second direction is parallel to the second polarization direction.

9. The liquid crystal display panel according to claim 3, wherein the second trunk electrode comprises a first portion and a second portion spaced apart from each other and electrically connected to each other by a connecting portion.

10. The liquid crystal display panel according to claim 9, wherein the connecting portion is integrally formed with the first portion and the second portion.

11. The liquid crystal display panel according to claim 9, wherein an extending direction of the connecting portion is parallel to the second direction.

12. The liquid crystal display panel according to claim 9, wherein an extending direction of the connecting portion is different from the second direction.

13. The liquid crystal display panel according to claim 1, wherein the pixel electrode further comprises a first edge electrode disposed around an outer boundary of the trunk electrode to form a closed first accommodation area, the trunk electrode and the branch electrodes are both located in the first accommodation area.

14. The liquid crystal display panel according to claim 13, wherein the trunk electrode and the branch electrodes are integrally formed with the first edge electrode.

15. The liquid crystal display panel according to claim 1, wherein each of the pixel units comprises a first pixel area and a second pixel area that are spaced apart from each other, the second pixel area is disposed around an outer boundary of the first pixel area, the pixel electrode comprises a first pixel electrode located in the first pixel area and a second pixel electrode located in the second pixel area, the first pixel electrode and the second pixel electrode are spaced apart from each other, and the second pixel electrode is disposed along an outer boundary of the first pixel electrode.

16. The liquid crystal display panel according to claim 15, wherein each of the domains at least comprises a first partition located in the first pixel area and a second partition located in the second pixel area.

17. The liquid crystal display panel according to claim 15, wherein the first trunk electrode is located in the first pixel area, and the second trunk electrode comprises a third portion located in the first pixel area and a fourth portion of the second pixel area.

18. The liquid crystal display panel according to claim 15, wherein the pixel electrode further comprises a second edge electrode and a third edge electrode; the second edge electrode is disposed around an outer boundary of the first pixel electrode to form a closed second accommodation area, and the first pixel electrode is located in the second accommodation area; the third edge electrode is disposed around an outer boundary of the second pixel electrode to form a closed third accommodation area, and the second pixel electrode is located in the third accommodation area.

19. The liquid crystal display panel according to claim 18, wherein the first pixel electrode is integrally formed with the second edge electrode, and the second pixel electrode is integrally formed with the third edge electrode.

20. The liquid crystal display panel according to claim 15, wherein the trunk electrode comprises a middle trunk portion and a side trunk portion located at a side of the middle trunk portion, and the branch electrode comprises a middle branch portion and a side branch portion located on a side of the middle branch portion; the middle trunk portion and the middle branch portion are located in a central area of the pixel electrode, a width of the middle trunk portion is greater than a width of the side trunk portion, and a width of the middle branch portion is greater than a width of the side branch portion.

* * * * *